(12) United States Patent
Kuppahally et al.

(10) Patent No.: US 11,940,990 B1
(45) Date of Patent: Mar. 26, 2024

(54) GLOBAL CLOCK VALUES FOR CONSISTENT QUERIES TO REPLICATED DATA

(71) Applicant: Amazon Technologies, Inc., Seattle, WA (US)

(72) Inventors: Sharatkumar Nagesh Kuppahally, Bellevue, WA (US); Ravi Math, Redmond, WA (US); Adam Douglas Morley, Seattle, WA (US); Ming-chuan Wu, Bellevue, WA (US); Wei Xiao, Bellevue, WA (US); Rajaprabhu Thiruchi Loganathan, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 61 days.

(21) Appl. No.: 15/625,976

(22) Filed: Jun. 16, 2017

(51) Int. Cl.
*G06F 16/23* (2019.01)
*G06F 16/245* (2019.01)
*G06F 16/27* (2019.01)

(52) U.S. Cl.
CPC ........ *G06F 16/2379* (2019.01); *G06F 16/245* (2019.01); *G06F 16/27* (2019.01)

(58) Field of Classification Search
None
See application file for complete search history.

(56) References Cited

U.S. PATENT DOCUMENTS

| | | |
|---|---|---|
| 5,799,305 A | 8/1998 | Bortvedt et al. |
| 5,806,075 A | 9/1998 | Jain et al. |
| 6,058,392 A | 5/2000 | Sampson |
| 6,226,650 B1 | 5/2001 | Mahajan et al. |
| 7,269,648 B1 | 9/2007 | Krishnan et al. |
| 7,305,529 B1 * | 12/2007 | Kekre ................. G06F 11/2058 707/999.008 |
| 7,356,550 B1 | 4/2008 | Lin et al. |
| 7,490,079 B2 | 2/2009 | Shipp |
| 7,657,574 B2 | 2/2010 | Gupta et al. |
| 8,335,776 B2 | 12/2012 | Gokhale |
| 8,392,482 B1 | 3/2013 | McAlister et al. |
| 8,554,724 B2 | 10/2013 | Zunger |
| 8,639,786 B2 | 1/2014 | Little |
| 9,218,383 B2 | 12/2015 | Tan et al. |
| 9,235,609 B1 | 1/2016 | Pandey et al. |
| 9,418,130 B2 | 8/2016 | Leshchiner et al. |

(Continued)

OTHER PUBLICATIONS

U.S. Appl. No. 15/632,266, filed Jun. 23, 2017, Tate Andrew Certain.

(Continued)

*Primary Examiner* — Kris E Mackes
*Assistant Examiner* — Soheila (Gina) Davanlou
(74) *Attorney, Agent, or Firm* — S. Scott Foster; Kowert, Hood, Munyon, Rankin & Goetzel, P.C.

(57) ABSTRACT

Consistent queries to replicated data may be performed according to global clock values. Time values for updates performed at a data set may be identified according to a global clock. The updates may be replicated to a replicated portion of a data set. Queries directed to the replicated portion of the data set may be performed in response to determining that the time values for updates indicate that the replicated portion of the data set is consistent with a time value identified for the query according to the global clock.

20 Claims, 9 Drawing Sheets

(56) References Cited

U.S. PATENT DOCUMENTS

| | | |
|---|---|---|
| 9,576,038 B1 | 2/2017 | Huang |
| 9,703,814 B1 | 7/2017 | Shams et al. |
| 10,013,449 B1 | 7/2018 | Xiao |
| 10,146,814 B1 | 12/2018 | Gupta |
| 10,423,493 B1 | 9/2019 | Vig |
| 10,652,115 B1 | 5/2020 | Chen et al. |
| 10,812,550 B1 | 10/2020 | Wells et al. |
| 10,860,604 B1 | 12/2020 | Pandey et al. |
| 10,936,559 B1 | 3/2021 | Jones et al. |
| 11,068,461 B1 | 7/2021 | Chan |
| 11,250,022 B1 | 2/2022 | Kuppahally et al. |
| 11,314,717 B1 | 4/2022 | Certain et al. |
| 2002/0194206 A1* | 12/2002 | Ganesh ............... G06F 16/2474 |
| 2005/0015436 A1 | 1/2005 | Singh et al. |
| 2005/0033777 A1 | 2/2005 | Moraes et al. |
| 2005/0193024 A1 | 9/2005 | Beyer et al. |
| 2005/0240531 A1 | 10/2005 | Wolff, Jr. |
| 2006/0271510 A1 | 11/2006 | Harward et al. |
| 2006/0277161 A1 | 12/2006 | Sampson |
| 2007/0050333 A1 | 3/2007 | Volger |
| 2008/0065598 A1 | 3/2008 | Ritter |
| 2008/0104149 A1 | 5/2008 | Vishniac |
| 2009/0323972 A1 | 12/2009 | Kohno |
| 2010/0132024 A1 | 5/2010 | Ben-Natan et al. |
| 2010/0281005 A1 | 11/2010 | Carlin et al. |
| 2010/0318795 A1 | 12/2010 | Haddad et al. |
| 2011/0113117 A1 | 5/2011 | Genest et al. |
| 2012/0096046 A1 | 4/2012 | Kucera |
| 2012/0310878 A1 | 12/2012 | Vuksan et al. |
| 2012/0330954 A1 | 12/2012 | Sivasubramanian et al. |
| 2013/0013606 A1 | 1/2013 | Stanfill |
| 2013/0132487 A1* | 5/2013 | Zhao ..................... H04L 67/141 709/206 |
| 2013/0238556 A1* | 9/2013 | Mielenhausen ..... G06F 16/2343 707/624 |
| 2014/0164668 A1* | 6/2014 | Charpentier ........ G06F 13/4027 710/313 |
| 2014/0258226 A1* | 9/2014 | Noteboom .......... G06F 16/2379 707/615 |
| 2014/0279855 A1 | 9/2014 | Tan et al. |
| 2014/0279881 A1 | 9/2014 | Tan |
| 2015/0268890 A1* | 9/2015 | Stefani .................. G06F 16/278 711/162 |
| 2016/0103828 A1 | 4/2016 | Wooldf |
| 2016/0132581 A1* | 5/2016 | Hsieh .................. H04L 67/1095 707/615 |
| 2016/0147859 A1 | 5/2016 | Lee |
| 2016/0188649 A1 | 6/2016 | Tan |
| 2016/0188690 A1 | 6/2016 | Tan |
| 2016/0306709 A1 | 10/2016 | Shaull |
| 2016/0364440 A1* | 12/2016 | Lee ......................... G06F 11/14 |
| 2017/0091809 A1 | 3/2017 | Liu |
| 2017/0116252 A1* | 4/2017 | Krishnaswamy ....... G06F 16/27 |
| 2017/0177700 A1 | 6/2017 | Bensberg et al. |
| 2017/0193041 A1 | 7/2017 | Fuchs |
| 2017/0371914 A1 | 12/2017 | Bourbonnais |
| 2018/0322157 A1 | 11/2018 | Lee |

OTHER PUBLICATIONS

U.S. Appl. No. 15/566,447, filed Dec. 10, 2014, Prashant Pandey et al.
U.S. Appl. No. 15/279,340, filed Sep. 28, 2016, Shawn Jones et al.
U.S. Appl. No. 17/037,507, filed Sep. 29, 2020, Kuppahally, et al.
U.S. Appl. No. 17/670,332, filed Feb. 11, 2022, Kuppahally, et al.

* cited by examiner

GLOBAL CLOCK VALUES FOR CONSISTENT QUERIES TO REPLICATED DATA

BACKGROUND

Data is often distributed to scale the storage capacity or processing capacity of systems that provide access to the data. For example, database tables or other data objects can be divided into partitions in order to leverage the capacity of different hosts, such as different servers or other computing devices, to separately provide access to individual partitions. As a result of partitioning data into different locations, obtaining a consistent view of the data can prove challenging when each location may independently perform updates on the different partitions. Techniques that can provide consistent views of the data without impeding the performance of updates by leveraging the distribution of the data are thus highly desirable.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to perform consistent queries to replicated data according to global clock values, according to some embodiments. A global clock may be implemented in various embodiments to provide consistency points across a distributed data set that are agreed upon by all members of the distributed data set (e.g., nodes that independently perform updates to portions of the data set). In this way, consistent indexes, views, projections, or other replicated portions of the distributed data set may be identified according to global clock values, in some embodiments.

Figure 1:
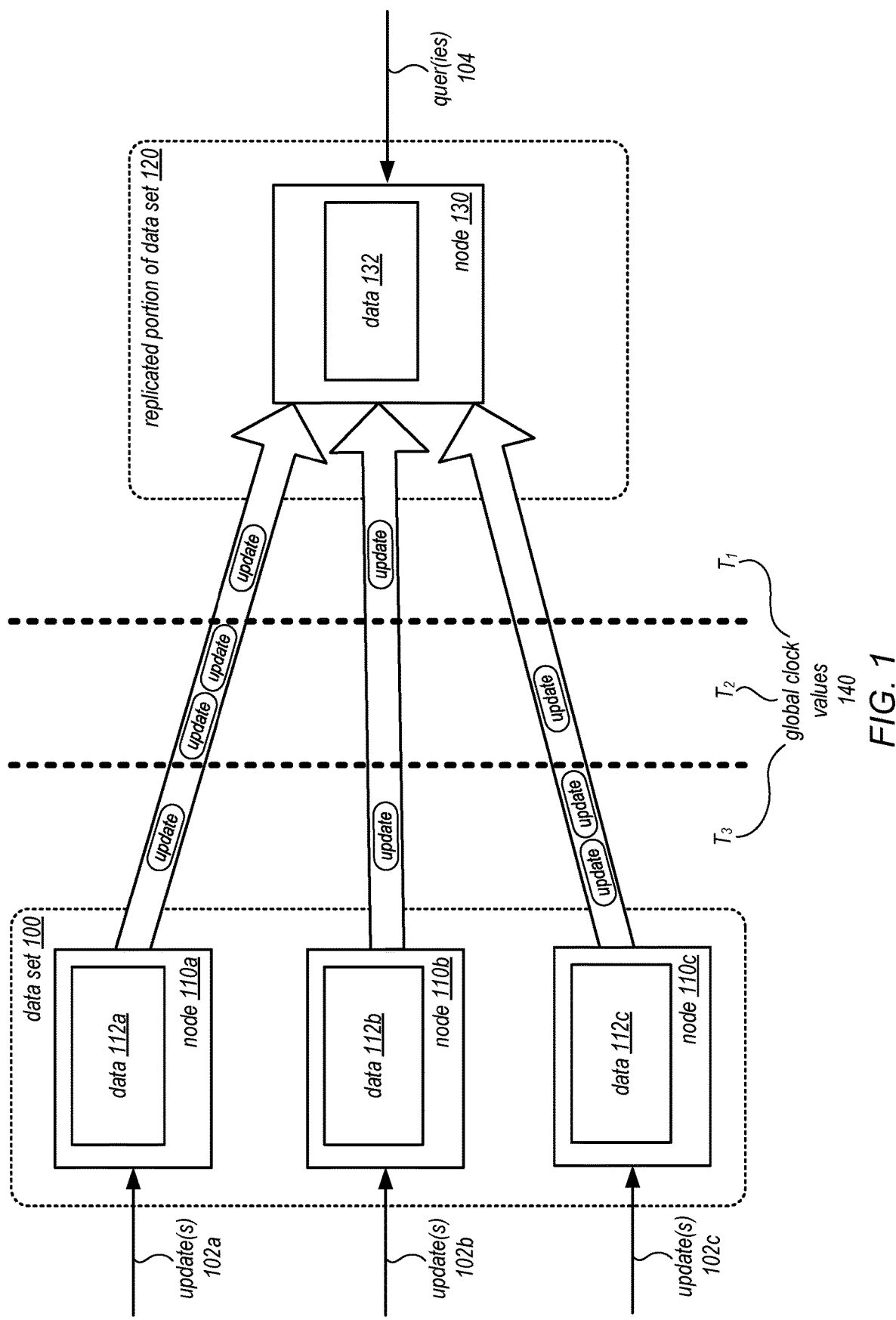
FIG. 1 is a logical block diagram illustrating global clock values for consistent queries to replicated data, according to some embodiments.

FIG. 1 is a logical block diagram illustrating global clock values for consistent queries to replicated data, according to some embodiments. Data set 100 may be one or more data structures, objects or other groupings of data distributed amongst multiple locations for storage and access, in some embodiments. For example, as illustrated in FIG. 1, different nodes, such as nodes 110a, 110b, and 110c, may store data that is part of data set 100, such as data 112a, 112b, and 112c respectively, in one embodiment. Data 112 may be partitions or other distributions of data from data set 100, in some embodiments, such as table partitions or other data objects that make up data set 100 that is stored as part of a relational or non-relational (e.g., NoSQL) database. In at least some embodiments, data 112 may be separately replicated amongst multiple nodes (not illustrated) in order to increase the durability and availability of data 112. For example node 110a may be one of multiple nodes storing copies of data 112a, in some embodiments. However, in at least some embodiments, one of the multiple nodes (e.g., node 110a) may be responsible for sending updates to node 130 for separate replication.

A replicated portion of the data set 120 may also be maintained for access, in various embodiments. For example, node 130 may store data 132 which may be a portion of one or more different parts of data set 100, in one embodiment. As discussed below with regard to FIGS. 2-6, data 132 may be a secondary index, projection, or other view of data that represents a subset of data set 100, in one embodiment. In at least some embodiments, data 132 may be stored, organized, or made accessible to access, such as quer(ies) 104 differently than data 112 of data set 100. If replicated portion of data set 120 were a secondary index, for instance, then data 132 may store entries, objects, or other information from data set 100 in a different order on storage devices, in one embodiment.

Nodes, such as nodes 110a, 110b, 110c and 130 may be one or more virtual or physical storage devices, processing devices, servers or other computing systems, such as computing system 1000 discussed below with regard to FIG. 9 that may store data for data set 100 and replicated portion of data set 120, in various embodiments. Nodes may provide access to data objects. For example, as illustrated in FIG. 1, updates, such as updates 102a, 102b, and 102c may be received and processed at nodes 110a, 110b, and 110c respectively and queries, such as quer(ies) 104, may be received and processed at node 130, in one embodiment. Each node may independently process access requests, in various embodiments. For example, node 110*a* may process different updates 102*a* (e.g., to change a record, object, or entry in data 112*a*), than node 110*c*, which may process updates 102*c* (e.g., to insert or delete a record, object, or entry in data 112*c*). Updates 102 may be any change, addition, deletion, or other modification of data 100, in various embodiments.

In at least some embodiments, node 130 may provide access to data 132 as part of replicated portion of data set 120. For example, quer(ies) 104 may specify one or more predicates, search criteria, or other indication of desired data that may be applied to data 132 to be returned to a requestor, in one embodiment. A query may be specified according to a particular protocol or language (e.g., Structured Query Language (SQL)) or may be formatted according a programmatic interface (e.g., Application Programming Interface (API)), in one embodiment. In at least some embodiments, quer(ies) 104 may be identified for a consistent view with respect to data set 100 (or may be marked or identified for performance without a consistency guarantee).

Update(s) 102 performed at nodes 110 may be replicated to replicated portion of data set 120. For example, a description of the updates may be sent directly from nodes 110 to node 130, as illustrated in FIG. 1, or indirectly via a propagation system, as discussed below with regard to FIGS. 3 and 6. Node 130 may receive and apply those updates that are applicable to data 132, in various embodiments. For example, data 132 may be partition or other sub-portion of replicated portion of data set 120, and thus node 130 may only apply those updates that change data 132, in one embodiment. To ensure that quer(ies) 104 see a consistent view of replicated portion of data set 120, node 130 may identify a global clock value for a query and for updates received from nodes 110. For example, a global clock may be used to map clock values to individual updates so that updates are considered according to their global clock values, and not the individual local times of nodes 110*a* when the updates are performed (which may vary even if mapped to the same local time), in one embodiment. In at least some embodiments, a global clock may be implemented at a separate system or service from nodes 110 and node 130, such as global clock service discussed below with regard to FIGS. 2 and 4-6.

The global clock values 140 may be mapped to updates so that even if updates are performed at nodes with differing local times, the global clock values mapped to the updates may identify which updates need to be included as of a particular global clock value in order to provide a consistent view of data set 100, in one embodiment. For example, the updates sent from nodes 110*a* and 110*b* mapped to $T_1$ may provide a consistent view of data 132, while the updates from nodes 110*a* and 110*c* mapped to $T_2$ may provide a consistent view of data 132 at $T_2$ and the updates from nodes 110*a*, 110*b*, and 110*c* mapped to $T_3$ may provide a consistent view of data 132 at $T_3$. Thus if a query 104, where associated with time $T_1$, and node 130 were to determine that all updates for data 132 associated with $T_1$ were received (e.g., including an indication of no update or operation from node 110*c* (not illustrated), then node 130 may determine that data 132 is consistent with data set 100 and perform the query 104, in one embodiment. If, for instance, node 130 had not received an update mapped to $T_1$ from node 110*b*, then node 130 would delay performance of the query until it could determine that it had received any updates mapped to $T_1$ from node 110*b*, in one embodiment.

Please note that previous descriptions of performing consistent queries for replicated data according to global clock values are not intended to be limiting, but are merely provided as logical examples. The number of nodes or partitions of data set 100 may be different as may be the number of nodes storing replicated portion of data set 120, for example.

This specification begins with a general description of a provider network that may implement a database service that may perform consistent queries for replicated data according to global clock values, in one embodiment. Then various examples of a database service and a global clock service are discussed, including different components/modules, or arrangements of components/module, that may be employed as part of implementing the database service, in one embodiment. A number of different methods and techniques to implement performing consistent queries for replicated data according to global clock values are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
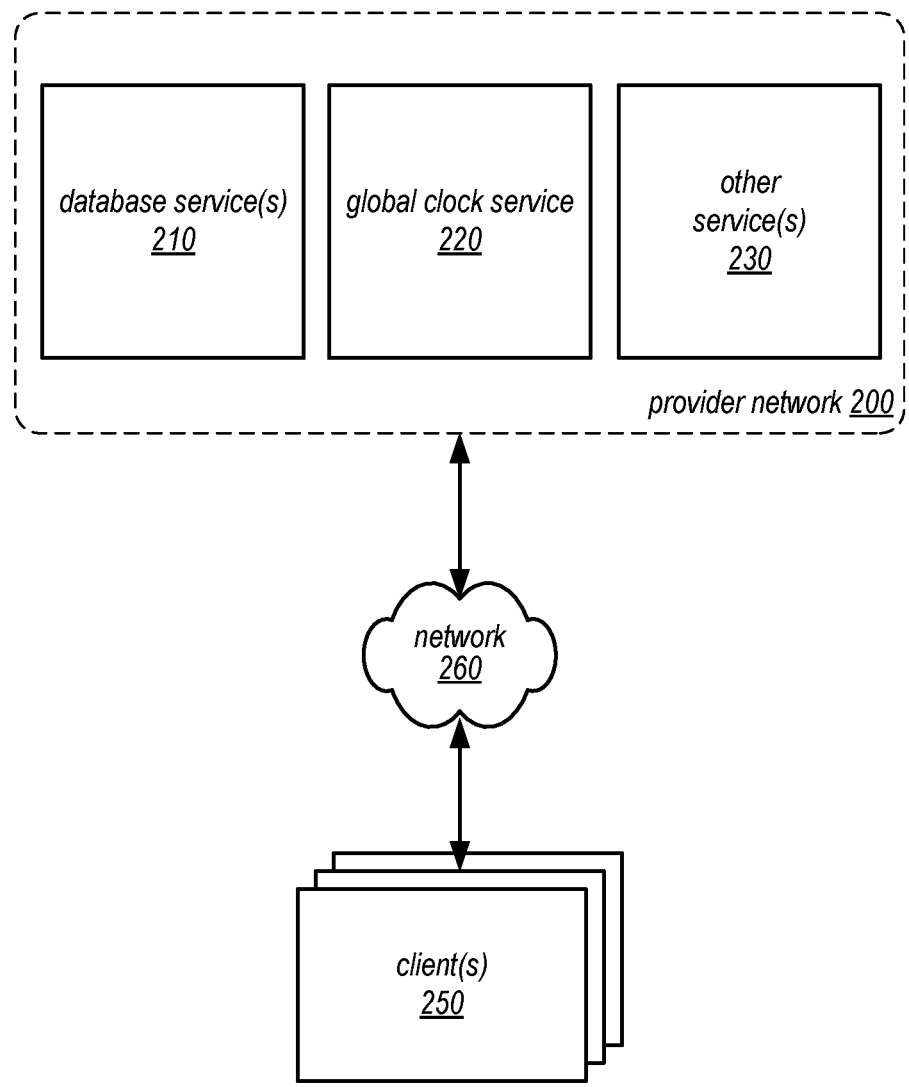
FIG. 2 is a logical block diagram illustrating a provider network that implements a database service and global clock service, according to some embodiments.

FIG. 2 is a logical block diagram illustrating a provider network that implements a database service and global clock service, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 250, in another embodiment. In one embodiment, provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. In one embodiment, provider network 200 may implement various computing resources or services, such as database service(s) 210 (e.g., relational or non-relational (NoSQL) database query engines), or other data processing services as part of other services 230, such as map reduce processing, data warehouse, data flow processing, and/or other large scale data processing techniques), data storage services (e.g., an object storage service, block-based storage service, or data storage service that may store different types of data for centralized access), virtual compute services, and/or any other type of network based services (which may include various other types of storage, processing, analysis, communication, event handling, visualization, and security services not illustrated). In at least some embodiments, provider network 200 may implement global clock service 220 to provide global clock values for performing consistent reads to replicated data for database service(s) 210 or other services 230.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 9 and described below. In one embodiment, the functionality of a given system or service component (e.g., a component of database service(s) 210) may be implemented by a particular node or may be distributed across several nodes. In some embodiments, a given node may implement the functionality of more than one service system component (e.g., more than one data store component).

Database service(s) 210 may include various types of database services, in one embodiment, (both relational and non-relational) for storing, querying, and updating data. Such services may be enterprise-class database systems that are highly scalable and extensible. In one embodiment, queries may be directed to a database in database service(s) 210 that is distributed across multiple physical resources, and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service(s) 210 may provide a RESTful programmatic interface in order to submit access requests (e.g., to get, insert, delete, or query data). In one embodiment, database service(s) 210 may also be any of various types of data processing services to perform different functions (e.g., query or other processing engines to perform functions such as anomaly detection, machine learning, data lookup, or any other type of data processing operation). For example, in at least one embodiment, database service(s) 210 may include a map reduce service that creates clusters of processing nodes that implement map reduce functionality over data stored in one of data storage services 220. Various other distributed processing architectures and techniques may be implemented by database service(s) 210 (e.g., grid computing, sharding, distributed hashing, etc.) in another embodiment.

In one embodiment, clients 250 may encompass any type of client configurable to submit network-based requests to provider network 200 via network 260, including requests for database service(s) 210 (e.g., to perform a consistent query at a secondary index for a database hosted in database service 210) or data storage service(s) (e.g., a request to create, read, write, obtain, or modify data in data storage service(s), etc.). For example, in one embodiment a given client 250 may include a suitable version of a web browser, or may include a plug-in module or other type of code module that executes as an extension to or within an execution environment provided by a web browser. Alternatively in a different embodiment, a client 250 may encompass an application such as a database application (or user interface thereof), a media application, an office application or any other application that may make use of storage resources in data storage service(s) to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that interacts directly with provider network 200, in one embodiment. In one embodiment, client 250 may generate network-based services requests according to a Representational State Transfer (REST)-style network-based services architecture, a document- or message-based network-based services architecture, or another suitable network-based services architecture.

In one embodiment, a client 250 may provide access to provider network 200 to other applications in a manner that is transparent to those applications. For example, client 250 may integrate with a database on database service(s) 210. In such an embodiment, applications may not need to be modified to make use of the storage system service model. Instead, the details of interfacing to the database service(s) 210 may be coordinated by client 250.

Client(s) 250 may convey network-based services requests to and receive responses from provider network 200 via network 260, in one embodiment. In one embodiment, network 260 may encompass any suitable combination of networking hardware and protocols necessary to establish network-based-based communications between clients 250 and provider network 200. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 250 and the Internet as well as between the Internet and provider network 200. It is noted that in one embodiment, client(s) 250 may communicate with provider network 200 using a private network rather than the public Internet.

Figure 3:
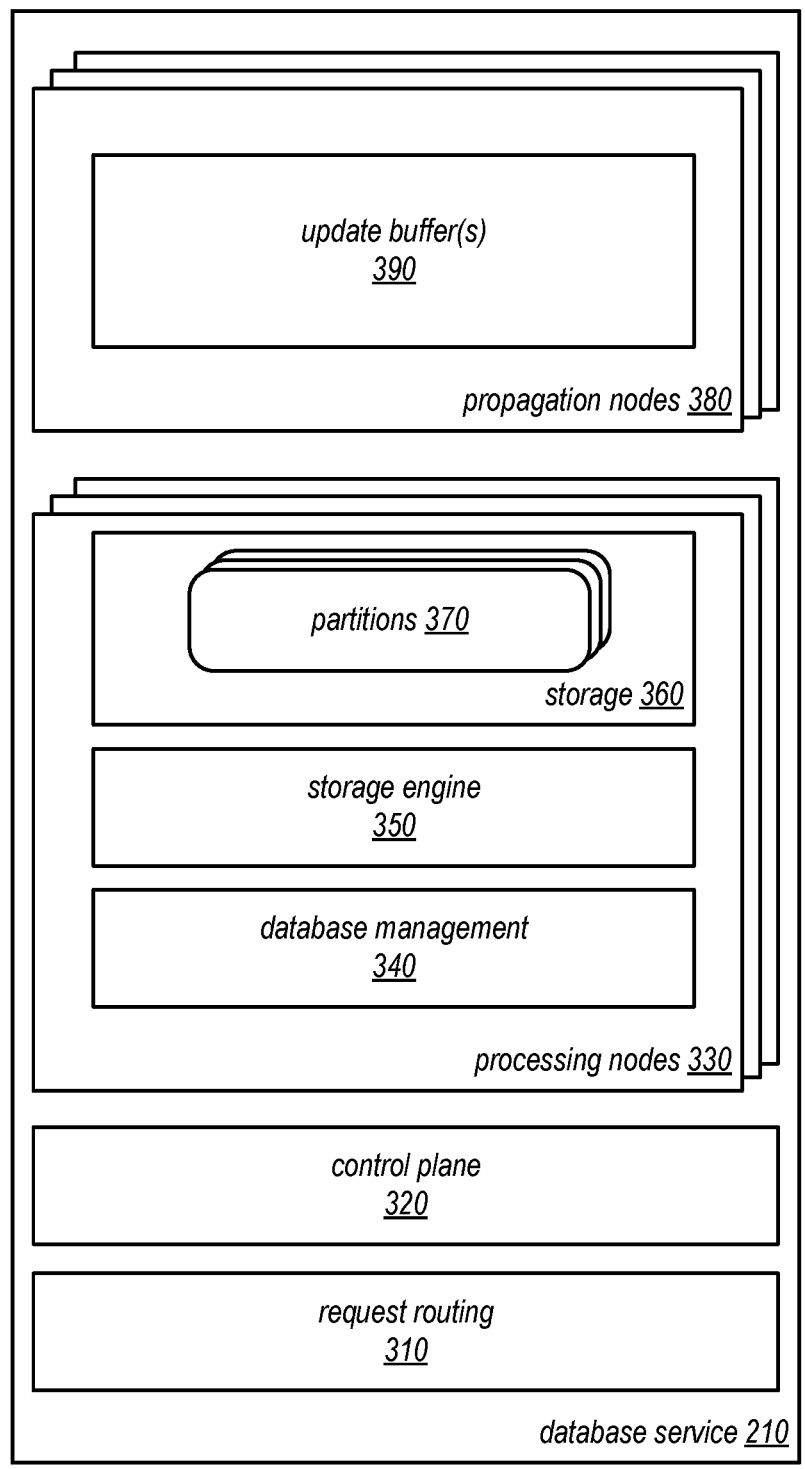
FIG. 3 is a logical block diagram illustrating a database service that may implement consistent queries for secondary indexes generated from database tables according global clock values, according to some embodiments.

FIG. 3 is a logical block diagram illustrating a database service that may implement moving database partitions from replica nodes, according to some embodiments. Database service 210 may implement request routing 310, in one embodiment. Request routing may 310 receive, authenticate, parse, throttle and/or dispatch service or other access requests, among other things, in one embodiment. In one embodiment, database service 210 may implement control plane 320 to implement one or more administrative components, such as automated admin instances which may provide a variety of visibility and/or control functions). In one embodiment, database service 210 may also implement a plurality of processing nodes 330, each of which may manage one or more partitions 370 of a data set (e.g., a database) on behalf of clients/users or on behalf of the data storage service (and its underlying system) which may be stored in storage (on storage devices attached to processing nodes 330). In at least one embodiment, database service 210 may implement propagation nodes 380 which may propagate or otherwise replicate updates to partition(s) 370 from one processing node 330 to another processing node 330, which may store a replicated portion of a database table (e.g., a global secondary index).

Control plane 320 may provide visibility and control to system administrators, detect split events for processing nodes, and/or anomaly control, resource allocation, in one embodiment. In one embodiment, control plane 320 may also include an admin console, through which system administrators may interact with database service 210 (and/or the underlying system). In one embodiment, the admin console may be the primary point of visibility and control for database service 210 (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 320 may provide an interface or access to information stored about one or more detected control plane events, such as split requests to be processed, at database service 210, in one embodiment.

Control plane 320 may direct the performance of different types of control plane operations among the nodes, systems, or devices implementing database service 210, in one embodiment. For instance, control plane 320 may communicate with processing nodes to initiate the performance of various control plane operations, such as moves, splits, update tables, delete tables, create indexes, etc. . . . . . In one embodiment, control plane 320 may update a task registry (or some other table or data structure) with the status, state, or performance information of the control plane operations currently being performed. Control plane 320 may detect, direct, or otherwise instigate different partition movement operations. In at least some embodiments, control plane 320 may direct the creation, allocation, maintenance, and otherwise management of secondary indexes for database tables, such as global secondary indexes.

In one embodiment, request routing 310 may support handling requests formatted according to an interface to support different types of web services requests. For example, in one embodiments, database service 210 may implement a particular web services application programming interface (API) that supports a variety of operations on tables (or other data objects) that are maintained and managed on behalf of clients/users by the data storage service system (and/or data stored in those tables). In one embodiment, database service 210 may support different types of web services requests. For example, in one embodiments, database service 210 may implement a particular web services application programming interface (API) that supports a variety of operations on tables (or other data objects) that are maintained and managed on behalf of clients/users by the data storage service system (and/or data stored in those tables). In one embodiment, request routing 310 may perform parsing and/or throttling of service requests, authentication and/or metering of service requests, dispatching service requests, and/or maintaining a partition assignments that map processing nodes to partitions.

Processing nodes 330 may implement database management 340, in one embodiment. Database management 340 may create, update, define, query, and/or otherwise administer databases, in one embodiment. For instance, database management 340 may maintain a database according to a database model (e.g., a relational or non-relational database model). In one embodiment, database management 340 may allow a client to manage data definitions (e.g., Data Definition Language (DDL) requests to describe column definitions, requests to add item attributes, etc.). In one embodiment, database management 340 may handle requests to access the data (e.g., to insert, modify, add, or delete data as well as requests to query for data by generating query execution plans to determine which partitions of a database may need to be evaluated or searched in order to service the query). In one embodiment, database management 340 may also perform other management functions, such as enforcing access controls or permissions, concurrency control, or recovery operations. In one embodiment, database management 340 may send requests to storage engine 350 to access partitions 370 in order to process access requests (e.g., requests to read or scan different partitions or particular items or parts of data within a partition).

Database management 340 may also obtain global clock value mappings, as discussed below with regard to FIGS. 5 and 6, in order to determine the mapping of local time at the processing nodes 330 to global clock values, in some embodiments. Database management 340 may associate or otherwise identify, access requests, such as queries or updates to a partition based on the local time mapping (e.g., mapping a query or update received with a 10 millisecond local clock interval to a global clock value), in some embodiments. Database management 340 may send messages or other indications of updates to other processing nodes 340 or propagation nodes 380 in order to replicate changes, in some embodiments. The messages may include an indication of the global clock value associated with the updates, in some embodiments.

In one embodiment, processing nodes 330 may implement storage engine 350 to access storage 360 (e.g., internal or external to processing nodes 330) that store partitions 370. Storage engine 350 may perform requests on behalf of database management to create, read, update and delete (CRUD) data in a partition, in one embodiment. Storage engine 350 may implement buffers, caches, or other storage components to reduce the number of times storage is accessed, in one embodiment. Storage engine 350 may implement various storage interfaces to access storage 360. For example, in those embodiments where external storage is a network-based data storage service, like another data storage service in provider network 200 in FIG. 2, then storage engine 350 may establish a network connection with the service as part of obtaining access to a storage unit (e.g., by submit requests formatted according to a protocol or API to establish the connection). In another embodiment, storage engine 350 may access internal storage using storage protocols (e.g., Small Computer Systems Interface (SCSI)) over a bus or other interconnect that directly connects a host implementing storage engine 350 with storage 360).

In one embodiment, database service 210 may provide functionality for creating, accessing, and/or managing tables processed at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 3. Note also that in one embodiment, one or more processing nodes 330 process access requests on behalf of clients directed to tables. Some of these processing nodes may operate as if they were in a multi-tenant environment, and others may operate as if they were in a single-tenant environment. In one embodiments, processing nodes 330 that operate as in a multi-tenant environment may be implemented on different processing nodes (or on different virtual machines executing on a single host) than processing nodes that operate as in a single-tenant environment.

In addition to dividing or otherwise distributing data sets across processing nodes 330 in separate partitions, processing nodes 330 may also be used to may be implementing or maintaining resources in multiple different arrangements, some of which may be part of larger collections or groups of resources. A replica group, for example, may be composed of a number of processing nodes maintaining a replica of particular portion of data (e.g., a partition of a table) for the database service 210. Moreover, different replica groups may utilize overlapping nodes, where a processing node 330 may be a member of multiple replica groups, maintaining replicas for each of those groups whose other processing node 330 members differ from the other replica groups. Thus if, for example replica group 1 has processing nodes A, B, and C, replica group 2 may have processing nodes B, D, and E. Besides differing groups of processing nodes, in various embodiments, processing nodes may have different relationships to other processing nodes. Continuing with the above example, for replica group 1, storage node A may be a master node, performing special functions with regard to access requests directed toward the partition maintained by replica group 1. For replica group 2, however, processing node B may be the master node. Therefore, a processing node's relationship to other processing nodes may be different depending on the particular grouping evaluated. These various examples of different arrangements of resources among processing nodes highlight the various different ways that control plane operations may interact with resources that are not solely devoted to one particular (though they may be) function, data replica, etc.

In at least some embodiments, the systems underlying the database service 210 described herein may store data on behalf of storage service clients (e.g., client applications, users, and/or subscribers) in tables containing items that have one or more attributes. In some embodiments, database service 210 may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white" }, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210 (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, pre-defined database schemes may be employed, such as the various types of relational databases implemented using Server Query Language (SQL).

In at least some embodiments, database service 210 may implement propagation nodes 380. Propagation nodes 380 may receive indications of updates from processing nodes 330. Propagation nodes 380 may store received updates in update buffer 390 until the updates are sent to other propagation nodes 380 or processing nodes 330 to be applied to replicated portions of a data set, such as a global secondary index. In at least some embodiments, propagation nodes 380 may maintain mapping, routing, or other information which maps updates to processing nodes for replication (not illustrated).

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate processing nodes, import tables, export tables, delete tables or secondary indexes, explore tables or secondary indexes (e.g., to generate various performance reports or skew reports), modify table configurations or operating parameter for tables or secondary indexes (e.g., by modifying the amount of throughput capacity, adding storage capacity for additional read replicas, splitting partitions or moving partitions), and/or describe tables or secondary indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API) or secondary indexes (e.g., a CreateSecondaryIndex API and/or a DeleteSecondaryIndex API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters, e.g., an UpdateTable API (which may be used to increase provisioned throughput capacity for a given table or create a secondary index for the table), a PurchaseTableCapacity API (which may be used to increase the provisioned storage capacity for a given table), a SplitTable API (which may be used to explicitly invoke an operation to split a table or any of its partitions), or a MoveTable API (which may be used to explicitly invoke an operation to move one or more tables, partitions of a table, or partition replicas of a table).

Database service 210 may include support for some or all of the following operations on data maintained in a table (or index) by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API.

Figure 4:
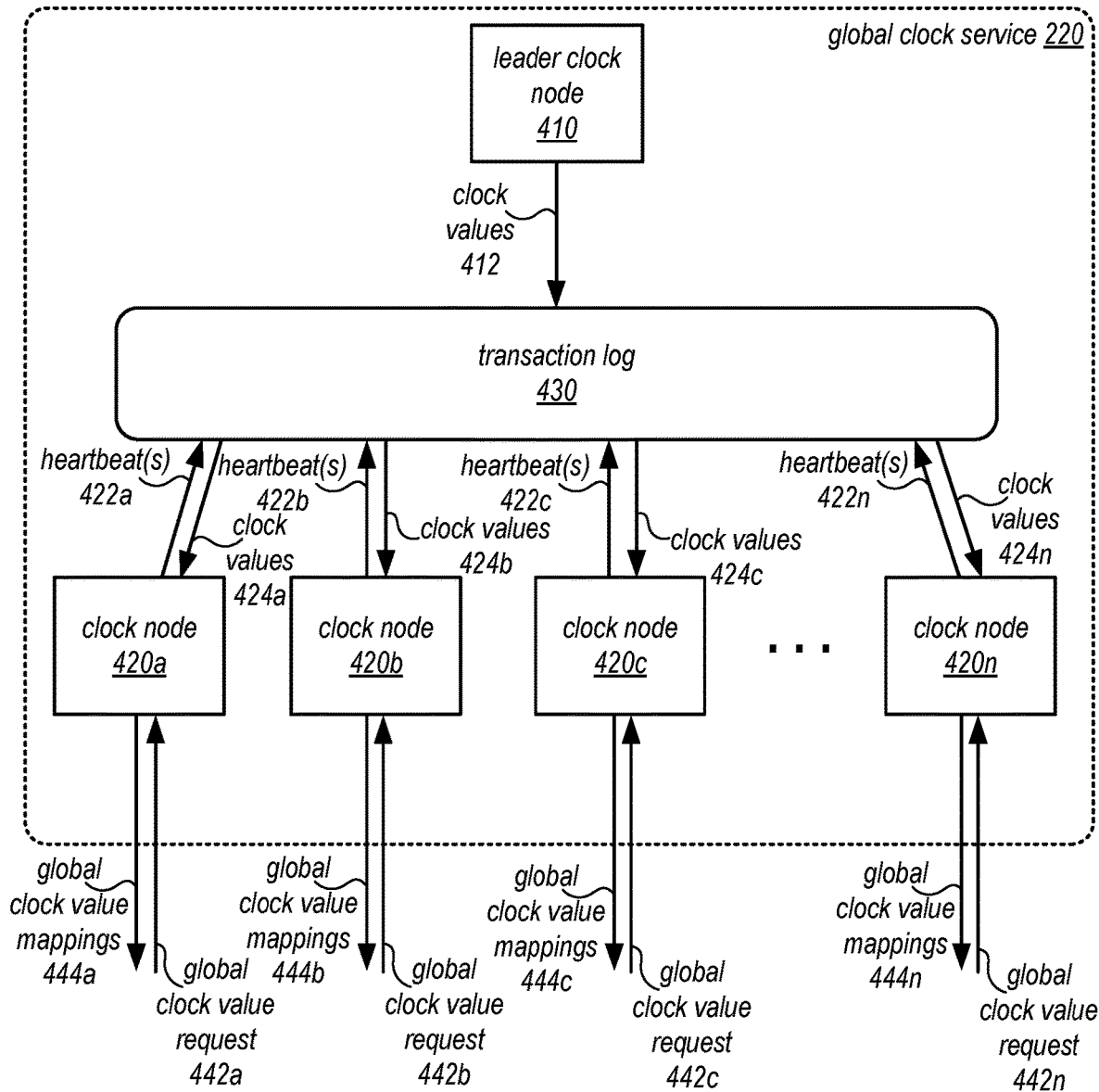
FIG. 4 is a logical block diagram is a global clock service that provides global clock values to clients, according to some embodiments.

FIG. 4 is a logical block diagram is a global clock service that provides global clock values to clients, according to some embodiments. Global clock service 220 may implement a plurality of different clock nodes, such as leader clock node 410 and clock nodes 420a, 420b, 420c, and 420n, to determine and provide global clock value mappings in response to requests.

Clock nodes may elect a leader, such as leader clock node 410 (which may selected according to various leader election schemes). Leader node 410 may, in some embodiments, publish clock values 412 (e.g., multiple times in 1 second) to transaction log 430. Clock nodes 420 may transmit public heartbeat(s) 422a, 422b, 422c, and 422n respectively to transaction log 430 (e.g., periodically). Based on the clock values (e.g., 424a, 424b, 424c, and 424n) and the heartbeat(s) in transaction log 430, clock nodes 420 can determine stop times for each global clock value in local clock terms, in various embodiments. For example, each clock value 412 published by leader clock node 410 may contain global clock values at 20 millisecond intervals for the next 1 second. Clock nodes 420 can individually determine a clock node's start and end times in leader clock node's local clock time (e.g., Unix times), in various embodiments.

Processing nodes, propagation nodes, or other clients of global clock service 220 can submit requests to clock nodes 420, such as global clock value requests 442a, 442b, 442c, and 442n, in some embodiments. In response, clock nodes 420 may send global clock value mappings, specific to each requesting client (e.g., specific to the requesting processing node or propagation node), such as global clock value mappings 444a, 444b, 444c, and 444n.

Transaction log 430 may provide a fault tolerant, high performance, durable, log storage. Transaction log 430 may be used as a commit log underlying global clock service. Transaction log 430 may provide strong consistency guarantees and support constraints between committed records, to enable features like deduplication, sequencing, and read-write conflict detection. Transactions in transaction log (e.g., proposed clock values 412 and heartbeats 422) may be ordered according to transaction sequence numbers, which may be monotonically increasing to reference the state of the log.

As noted above, database service 210 may, in some embodiments, store data sets as tables of items (which may include one or more data values or attributes) that may be stored, managed and accessed according to a key value pair which uniquely identifies an item in the table. Generally, this may allow for fast throughput to update data in items or store new items. However, in some scenarios, locating items that have particular attributes may be resource intensive, in some embodiments. For instance, identifying items with a particular attribute value that is within a range of values would likely instigate a scan of an entire table even though the range of values may be only a small portion of possible values for the particular attribute or the particular attribute may not exist for some items in the table, in one embodiment.

One example of a replicated portion of data may be a secondary index, in some embodiments. Secondary indexes may be created for a table in order to provide an alternative access schema for items in addition to a unique key value pair, in some embodiments. For instance, a table that includes items for registered users may include a user identifier, which is unique and primary key for the item, along with a first name attribute, last name attribute, gender attribute, and age attribute. A secondary index may be generated for the table which can index items according to other values than the key value pair, such as gender and age. For example, the secondary index may be generated so that all items with male attribute values are stored together according to age attribute value order. Similarly, all items with female attribute values are stored together according to age attribute value order. In this way, an access request for data that specifies a particular range of ages for males or females may be quickly obtained without performing a scan of the entire table of items, in some embodiments. Other attribute values may also be included in the secondary index, such as first and last name attribute values. In at least some embodiments, the key value pair that uniquely identifies the item may be included in the secondary index (e.g., the user identifier). Once created, a secondary index can be updated with any changes made to the original table.

As secondary indexes may be updated according to changes made or performed at several different partitions, consistent queries to secondary indexes may be desirable in order to ensure that a query is performed using a consistent and current view of the database (with respect to the time at which the query was received). FIG. 5 is logical block diagram illustrating interactions between processing nodes storing a database table and a secondary index that utilize global clock values to support consistent queries to the secondary index, according to some embodiments. Table 520 may be stored in different partitions, 522a, 522b, 522c, 522d, and 522e, across different processing nodes, 510a, 510b, 510c, 510d, and 510e (or in different replica groups of processing nodes as discussed above), in one embodiment. Secondary index 540 may be generated as a different index of some of the item attributes from table 520 and may be stored in partitions, 542a and 542b, at processing nodes 530a and 530b respectively (which may also be replica groups of processing nodes), in one embodiment.

Both processing nodes 510 for table 520 and processing nodes 530 may obtain clock value mappings 502 and 504 from global clock service 220. For example, each processing node or propagation node may send a request to global clock service 220 which may dispatch that request to a clock node, as discussed above in FIG. 4. The clock node may return global clock values mapped to local time at the processing node or propagation node so that when an update, an update to be replicated, or a query is received, the update, update to be replicated, or query may be mapped to a global clock value. For example, processing nodes 510 may then send index partition updates 550 for identified global clock values to processing nodes 530. For example, as discussed above in FIG. 1, one or multiple updates may be mapped to a single global clock value (e.g., because they were received and processed within a range of local time mapped to the same global clock value). The updates may be sent 550 along with an indication of the global clock value for those updates. In some embodiments, if no updates were performed than a no-op or other indication to represent no changes to a partition 522 in table 520 may be sent along with a global clock value for the range of local time in which no changes to the partition were performed.

Processing nodes 530 can apply updates as they are received, in some embodiments, or apply all updates for a global clock value together, in other embodiments. When a query is received at one of processing nodes 530, processing nodes 530 can determine whether all updates (or no-ops) for the global clock value (e.g., $T_i$) identified for the query have been received and applied (e.g., by checking to see if updates or no-ops for a next global clock value, $T_{i+1}$, have been received for all partitions 522) in order to determine whether secondary index 540 is consistent with table 520. If not, then processing nodes 530 may delay the response to the query until updates (or no-ops) have been received and applied, in some embodiments.

As the number or size of secondary indexes grows, the capability of processing nodes storing a partition of a table to keep up with both replication responsibilities to all secondary indexes and access requests from clients may become impaired, in some embodiments. Propagation nodes assume the responsibility of correctly distributing table updates to index processing nodes, in some embodiments. In this way, processing nodes can simply forward updates to a single propagation node (without having to determine which index partitions need updates) saving computational time and network bandwidth for processing nodes hosting partitions of a table, in some embodiments. FIG. 6 is logical block diagram illustrating interactions between processing nodes storing a database table, propagation nodes, and a secondary index that utilize global clock values to support consistent queries to the secondary index, according to some embodiments.

Figure 5:
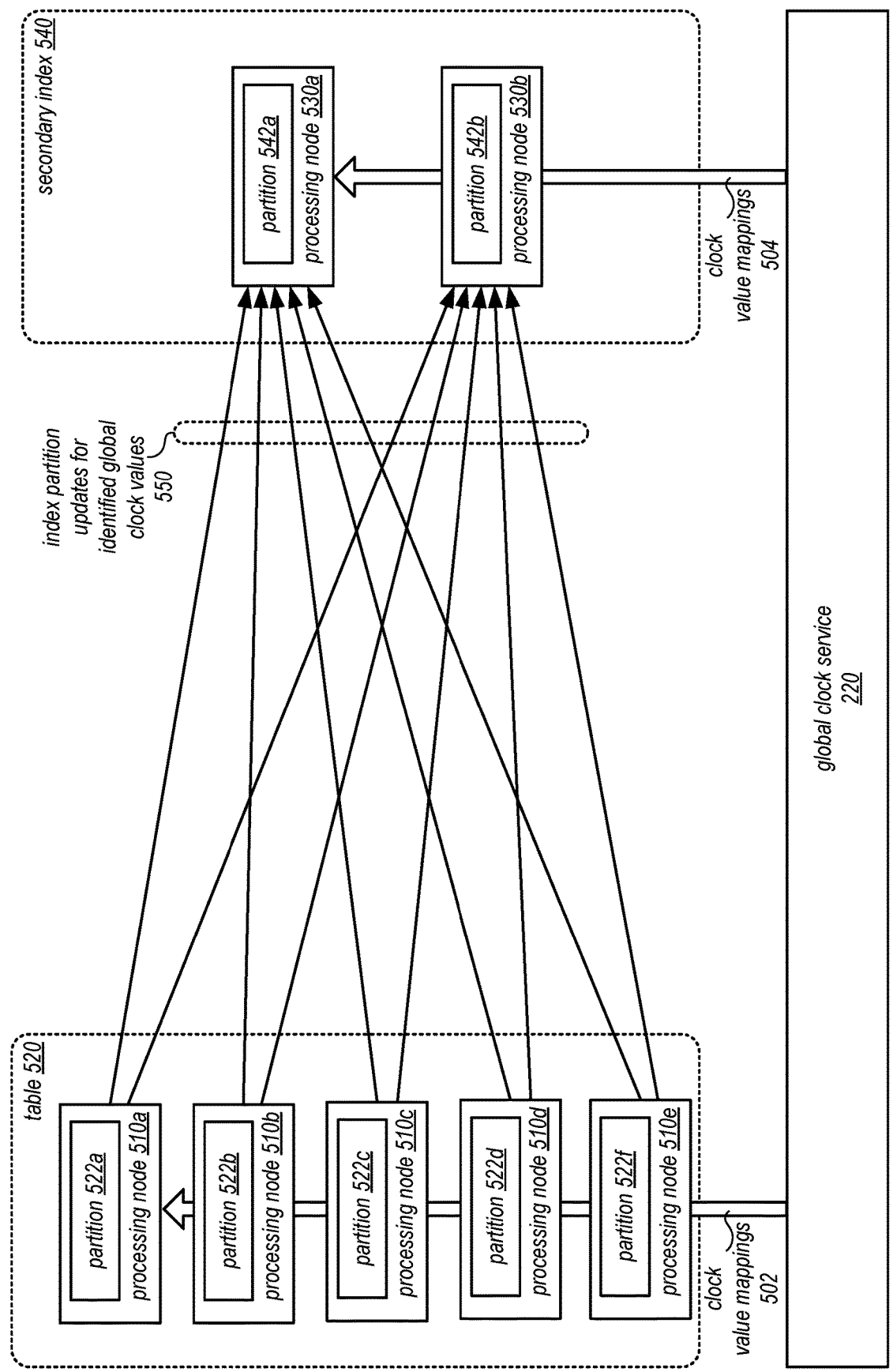
FIG. 5 is logical block diagram illustrating interactions between processing nodes storing a database table and a secondary index that utilize global clock values to support consistent queries to the secondary index, according to some embodiments.

Similar to FIG. 5 discussed above, table 620 may be stored in different partitions, 622a, 622b, 622c, 622d, and 622e, across different processing nodes, 610a, 610b, 610c, 610d, and 610e (or in different replica groups of processing nodes as discussed above), in one embodiment. Secondary index 650 may be generated as a different index of some of the item attributes from table 620 and may be stored in partitions, 652a and 652b, at processing nodes 640a and 640b respectively (which may also be replica groups of processing nodes), in one embodiment. Propagation nodes 630a, 630b, and 630c may replicate updates performed at processing nodes 610 to be performed at processing nodes 640.

Processing nodes 610 for table 620, propagation nodes 630, and processing nodes 530 may obtain clock value mappings 602, 604 and 606 from global clock service 220. For example, each processing node may send a request to global clock service 220 which may dispatch that request to a clock node, as discussed above in FIG. 4. The clock node may return global clock values mapped to local time at the processing node or propagation node so that when an update, an update to be replicated, or a query is received, the update, update to be replicated, or query may be mapped to a global clock value. For example, processing nodes 610 may send index partition updates 660 for identified global clock values to propagation nodes 630. Propagation nodes 630 may buffer or store all updates bound for a particular partition 652 or secondary index 650 together until all updates for a single global clock value have been received. Then, propagation nodes may send index partition updates 670 to the appropriate processing nodes 640 to have the updates applied to the appropriate partitions 652. As discussed above, processing nodes 610 and propagation nodes 630 may send a no-op or other indication to represent no changes to a partition 622 in table 620 may be sent along with a global clock value for the range of local time in which no changes to the partition were performed.

As in the discussion for FIG. 5 above, processing nodes 640 can apply updates as they are received, in some embodiments, or apply all updates for a global clock value together, in other embodiments. When a query is received at one of processing nodes 640, processing nodes 640 can determine whether all updates (or no-ops) for the global clock value (e.g., $T_i$) identified for the query have been received from propagation nodes 630 and applied (e.g., by checking to see if updates or no-ops for a next global clock value, $T_{i+1}$, have been received for all partitions 622) in order to determine whether secondary index 650 is consistent with table 620. If not, then processing nodes 640 may delay the response to the query until updates (or no-ops) have been received and applied, in some embodiments.

Figure 6:
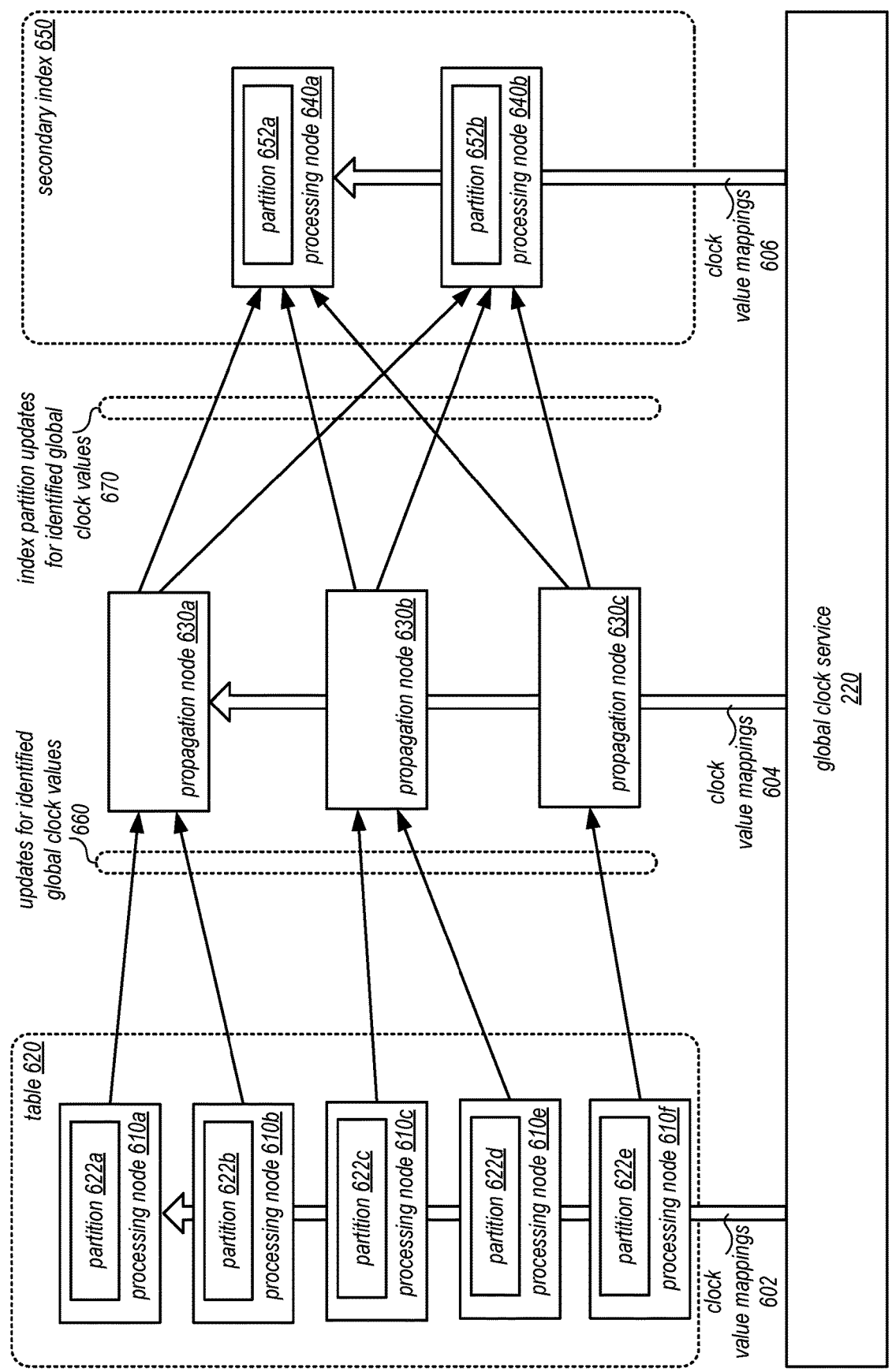
FIG. 6 is logical block diagram illustrating interactions between processing nodes storing a database table, propagation nodes, and a secondary index that utilize global clock values to support consistent queries to the secondary index, according to some embodiments.

Please note that although FIG. 6 illustrates a single layer of propagation nodes, multiple layers of propagation nodes may be implemented in some embodiments. For example, one propagation node may forward updates to another propagation node which may forward updates to a processing node for application in a secondary index.

Figure 7:
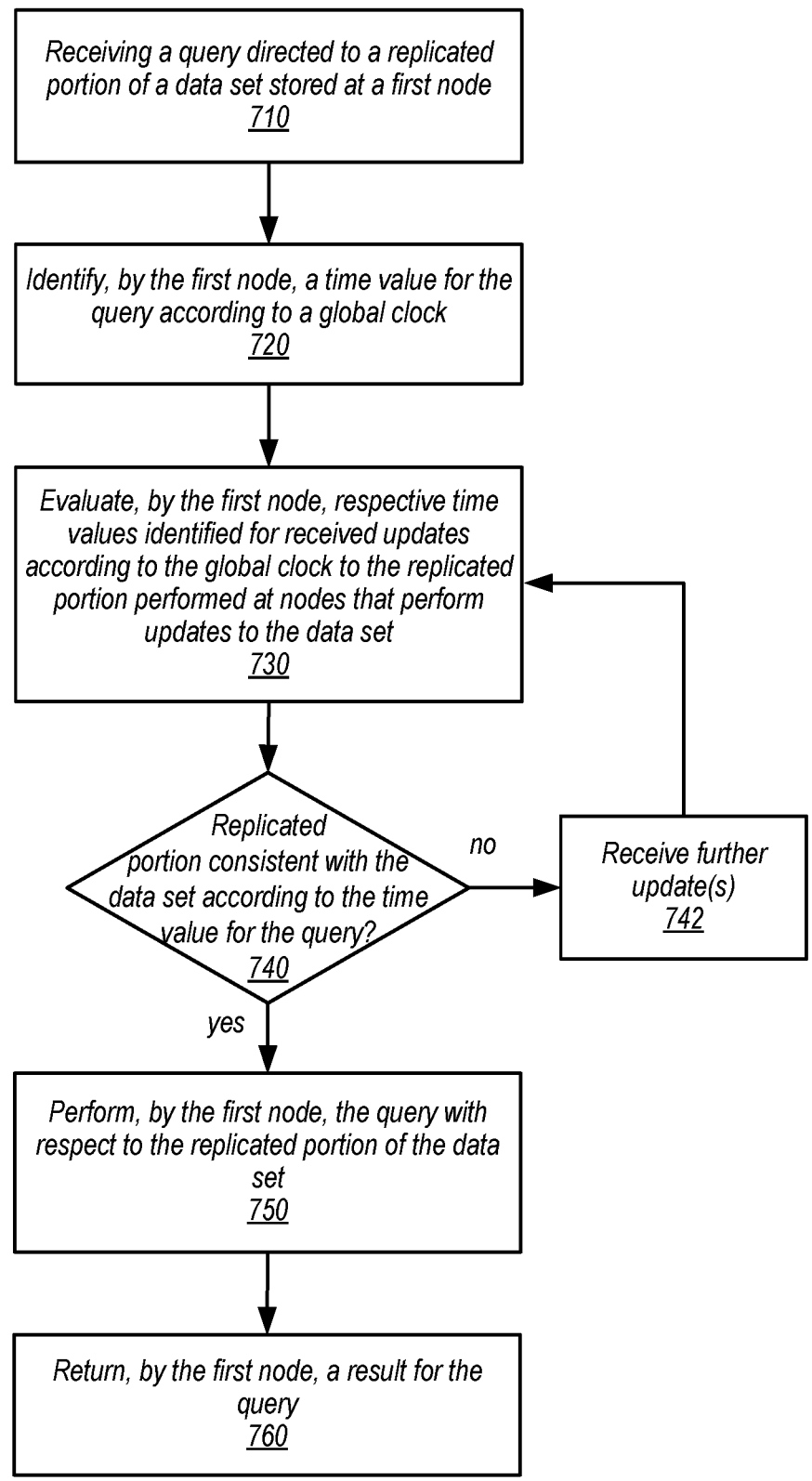
FIG. 7 is a high-level flowchart illustrating various methods and techniques to perform consistent queries to replicated data according to global clock values, according to some embodiments.

The examples of performing consistent queries at replicated data according to global clock values as discussed in FIGS. 2-6 above have been given in regard to a database service (e.g., a non-relational or NoSQL database service or a relational database service). However, various other types of data access, management, or control systems or data processing systems may implement performing consistent queries at replicated data according to global clock values, in other embodiments. FIG. 7 is a high-level flowchart illustrating various methods and techniques to perform consistent queries to replicated data according to global clock values, according to some embodiments. These techniques, as well as the techniques discussed with regard to FIG. 8, may be implemented using components or systems as described above with regard to FIGS. 2-6, as well as other types of databases, storage engines, systems, or clients and thus the following discussion is not intended to be limiting as to the other types of systems that may implement the described techniques.

As indicated at 710, a query directed to a replicated portion of a data set stored at a first node may be received, in some embodiments. For example, the query may identify a secondary index, projection, view, or other portion of data replicated from a data set (e.g., a database table, data object, collection of data objects, etc.). The query may be received via the various types of interfaces described above with regard to FIG. 3 (programmatic, user console, driver, etc.), in one embodiment. A query may be formatted according to different query languages, or specifications of query languages including Structured Query Language (SQL) or programmatic interfaces (e.g., RESTful API calls), in some embodiments. The query may include predicates, criteria, or other conditions or values for identifying desired data to be returned in response to the query, in some embodiments. In at least some embodiments, the query may include a consistency requirement or some other indication that the query is to be performed when the replicated portion of the data set is consistent with the data set. Some queries may be received without this requirement, in some embodiments, and may be processed without a determination as to whether the replicated portion of the data set is consistent with the data set.

As indicated at 720, a time value for the query may be identified for the query according to a global clock, in some embodiments. For example, a distributed clock determination mechanism or technique may be implemented to agree to clock values amongst multiple nodes, including the first node (e.g., by voting or other agreement protocols). In some embodiments, a global clock may be implemented by one or more clock nodes or service that provides a global clock value (or mappings to global clock values to requesting nodes, like the first node). In at least some embodiments, a local time for the query may be determined (e.g., according to a timestamp of when the query is received), which may then be mapped into a global clock value (e.g., based on the ranges of local time to global clock value mappings obtained from a global clock server, node, or service).

As indicated at 730, an evaluation, by the first node, may be performed that evaluates respective time values identified for update(s), identified according to the global clock, in various embodiments. The updates may be updates to the replicated portion that were performed at nodes that store the data set, in some embodiments. For example, the updates may add items, entries, values, attributes or other information, change, modify, or delete items, entries, values, attributes or other information that should be replicated to the replicated portion. The updates may be received along with global clock values (time values), in various embodiments. The evaluation may consider whether for the identified time values for the updates, whether the replicated portion is consistent with the data set as of the time value identified for the query, as indicated at 740. If, for instance, time $T_2$ is identified for the query, then the evaluation may determine whether all updates up to time $T_2$ have been applied to the replicated portion by examining the time values for received updates. For example, if updates (or no-op indications) with time values earlier than or equal to $T_2$ have been received for any of the nodes that perform updates, then, it may be that the updates for the replicated portion remain to be performed in order to be consistent with time $T_2$. If updates with time values later than $T_2$ have been received for all of the nodes that perform updates (e.g., $T_3$ or later) then, no updates may be outstanding with respect to providing a consistent view of the replicated portion at time $T_2$.

As indicated by the negative exit from 740, the replicated portion may not yet be consistent with the data set, and thus performance of the query may be delayed until further updates are received, as indicated at 742, with time values that indicate that the replicated portion is consistent with the data set. For example, the query processing thread may suspend for a period of time or may re-evaluate, as indicated at 730, as soon as an additional update is received. In some embodiments, additional or outstanding updates may be requested by the first node (e.g., by sending requests to the nodes that perform the updates, such as processing nodes 330 in FIG. 3 above or propagation nodes 380 in FIG. 3 above).

As indicated by the positive exit from 740, if the replicated portion of the data set is consistent with the data set based on the evaluation of the time values for the updates and the identified time value for the query, then the first node may perform the query with respect to the replicated portion of the data set, as indicated at 750. For example, the first node may scan, evaluate, or otherwise obtain the desired data according to the predicates, criteria, or other identifying conditions or values, in one embodiment. A result for the query may be returned by the first node, as indicated at 760.

Figure 8:
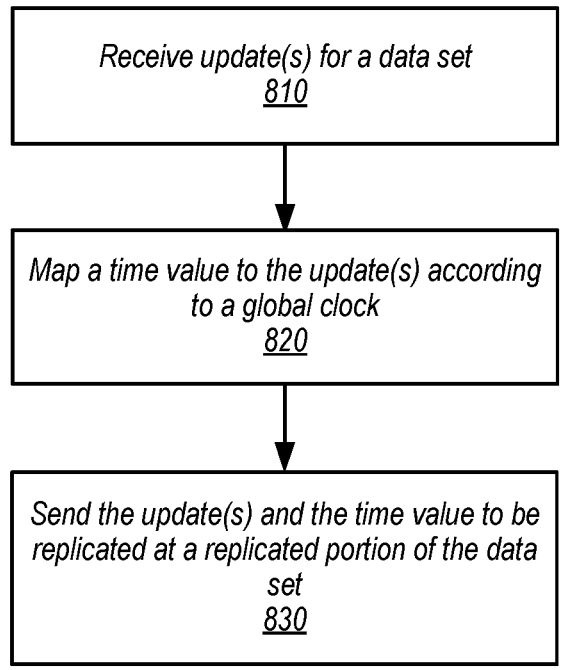
FIG. 8 is a high-level flowchart illustrating various methods and techniques to map and send updates to replicated data according to global clock values, according to some embodiments.

FIG. 8 is a high-level flowchart illustrating various methods and techniques to map and send updates to replicated data according to global clock values, according to some embodiments. As indicated at 810, updates may be received for a data set, in various embodiments. For example, the updates may add items, entries, values, attributes or other information, change, modify, or delete items, entries, values, attributes or other information in the data set. In some embodiments, the update(s) may be identified for replication to a replicated portion of the data set. For example, some updates may affect data that is not replicated, and thus may be excluded from replication to other nodes. Therefore, in at least some embodiments, updates not identified for replication may be filtered out.

As indicated at 820, a time value may be mapped to the update(s) according to a global clock, in various embodiments. For example, local time value(s) (e.g., Unix time) may be determined for each update (e.g., when received or performed). The local time values may then be compared with ranges of local values mapped to different global clock values, in some embodiments. Thus if the local time value for an update is 12:02:01.295 and the ranges for time values from the global clock are $T_1$=12:02:01.281 to 12:02:01.290, $T_2$=12:02:01.291 to 12:02:01.300, and so on, then the time value for the update according to the global clock may be $T_2$.

In at least some embodiments, a range of local time may be applied to a single time value for a global clock so that time may remain for other update(s) to be mapped to the clock value. Consider the example given above. If the current local time is 12:02:01.295, then 5 milliseconds remain in which other updates may be associated with the time value (e.g., if received within the next 5 milliseconds), and thus the sending of the update(s) may be delayed until local time has moved to the next clock value. If no time remains for other updates to be mapped to the clock value (e.g., local time is 12:02:01.301), then the update(s) and the time value may be sent to be replicated to the replicated portion of the data set. In some embodiments, the update(s) and mapped time value may be sent to be replicated at a replicated portion of the data set, as indicated at 830. In at least some embodiments, updates may be sent as they are received. The update(s) and time value may be sent to processing nodes and/or propagation nodes. The techniques discussed above with regard to FIG. 8 could be performed by processing nodes that perform updates or propagation nodes that forward updates.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Embodiments to perform consistent queries to replicated data according to global clock values as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

Figure 9:
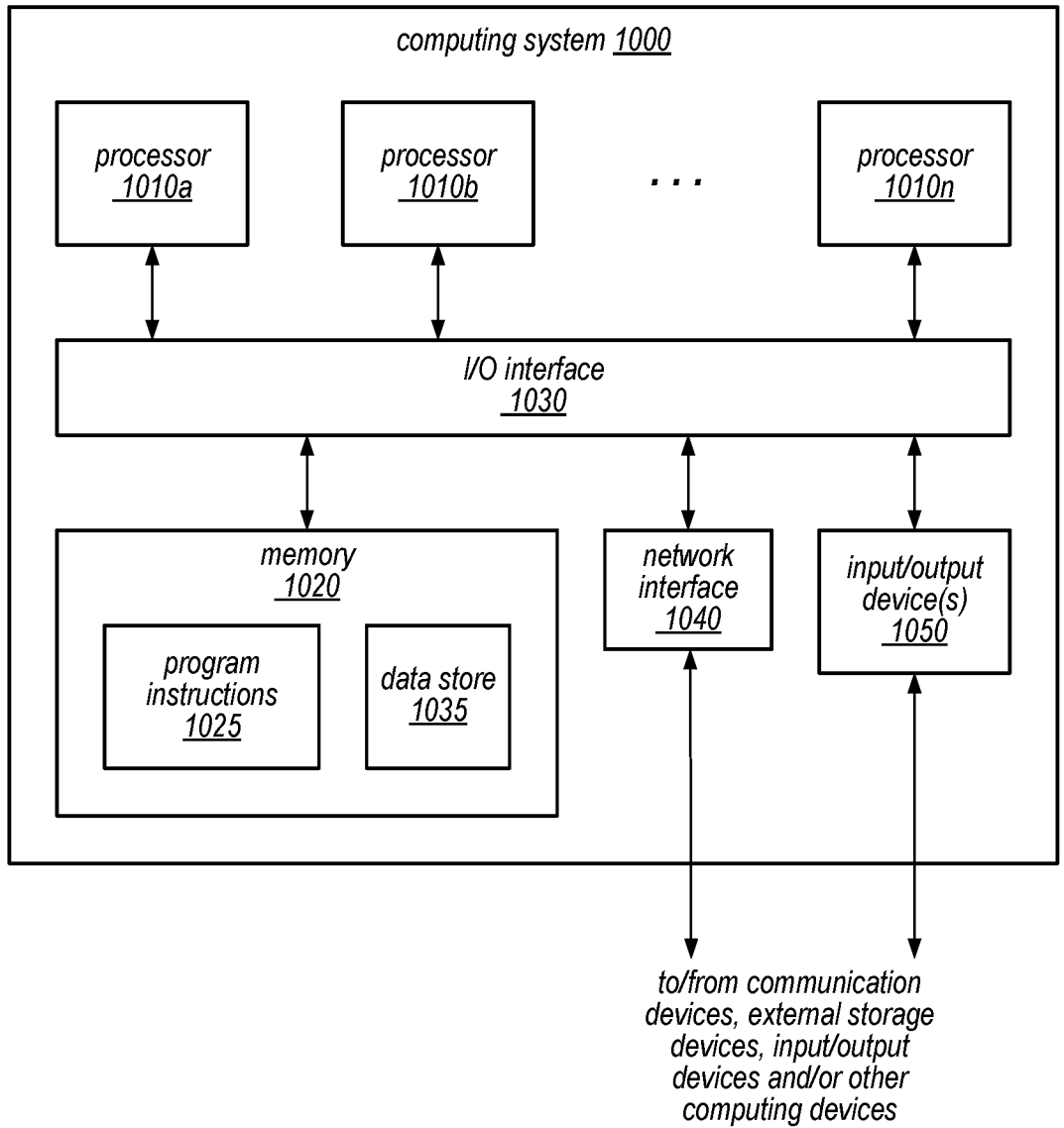
FIG. 9 is a block diagram illustrating an example computing system, according to some embodiments.

As shown in FIG. 9, memory 1020 may include program instructions 1025, that implement the various embodiments of the systems as described herein, and data store 1035, comprising various data accessible by program instructions 1025, in one embodiment. In one embodiment, program instructions 1025 may include software elements of embodiments as described herein and as illustrated in the Figures.

Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    a memory to store program instructions which, if performed by at least one processor, cause the at least one processor to perform a method to at least:
        receive at a first node, a query directed to a replicated portion of a data set, wherein the data set is stored at a plurality of other nodes and the replicated portion stored is at the first node;
        identify, by the first node, a global time value for the query according to a global clock, wherein the global time value for the query is determined based on a local time when the query is received at the first node;
        receive, at the first node from different ones of the plurality of other nodes, respective global time values identified for respective ones of a plurality of updates to the replicated portion, the updates received at the first node after being:
            received at respective ones of the plurality of other nodes that store respective subsets of the data set;
            identified with different respective local times at which the respective update is received at the respective node of the plurality of other nodes;
            performed independently at the respective ones of the plurality of other nodes that store respective subsets of the data set; and
            mapped to respective ones of the global time values according to the global clock based on the determined different respective local time;
            wherein at least two of the respective local times of respective ones of at least two different updates received at the first node differ from one another and map to a same global time value of the respective global time values;
        delay performance of the query at the first node until a determination that the replicated portion at the first node is consistent with the data set at the global time value identified for the query, wherein the determination:
            compares the respective global time values received from the plurality of other nodes at the first node and that are identified for respective ones of the plurality of received updates, to the global time value identified for the query; and
            based on the comparison, determines that respective performance of the plurality of updates to the replicated portion of the data set at the first node makes the replicated portion of the data set consistent with the data set at the global time value identified for the query;
        perform the received updates to the replicated portion of the data set stored at the first node;
        subsequent to performance of the received updates to the replicated portion of the data set stored at the first node, in response to the determination that the replicated portion at the first node is consistent with the data set, perform, by the first node, the query with respect to the replicated portion of the data set stored at the first node; and return, by the first node, a result for the query performed by the first node.

2. The system of claim 1, wherein the method further comprises:

for a given update to the data set performed at one of the plurality of other nodes:
determine a local time for the given update at the one node;
map, by the one node, the local time for the given update to a global time value according to the global clock; and
send, from the one node, the given update and the global time value to be replicated at the replicated portion of the data set.

3. The system of claim 2,
wherein the method further comprises obtain, by the one node, global time value mappings from a global clock node that map different ranges of local time for the one node to respective global time values of the global clock;
wherein to map the local time for the given update to the global time value, the program instructions cause the at least one processor to identify one of the different ranges that includes the local time for the given update that maps the identified range to the global time value.

4. The system of claim 1, wherein the first node and the plurality of other nodes are implemented as part of network-based, non-relational database service, wherein the data set is a database table partitioned across the plurality of other nodes, wherein the updates are performed at the plurality of other nodes in response to requests from one or more clients of the non-relational database service, and wherein the replicated portion of the data set is a partition of a secondary index for the database table.

5. A method, comprising:
receiving at a first node, a query directed to a replicated portion of a data set, wherein the data set is stored at a plurality of other nodes and the replicated portion is stored at the first node;
identifying, by the first node, a global time value for the query according to a global clock, wherein the global time value for the query is determined based on a local time when the query is received at the first node;
receiving, at the first node from different ones of the plurality of other nodes, respective global time values identified for respective ones of a plurality of updates to the replicated portion, the updates received at the first node after being:
received at respective ones of the plurality of other nodes that store respective subsets of the data set;
identified with different respective local times at which the respective update is received at the respective node of the plurality of other nodes;
performed independently at the respective ones of the plurality of other nodes that store respective subsets of the data set; and
mapped to respective ones of the global time values according to the global clock based on the determined different respective local times;
wherein at least two of the respective local times of respective ones of at least two different updates received at the first node differ from one another and map to a same global time value of the respective global time values;

delaying, by the first node, performance of the query at the first node until a determination that the replicated portion at the first node from the plurality of other nodes is consistent with the data set stored at the plurality of other nodes at the global time value identified for the query, wherein the determination comprises:
comparing respective global time values of a plurality of updates of the data set that have been performed independently at respective ones of the plurality of other nodes and received at the first node from the set of one or more other nodes that store the data set, to the global time value identified for the query, and
based on the comparisons, determining that performance of the plurality of updates applied to the replicated portion of the data set makes the replicated portion of the data set consistent with the data set at the global time value identified for the query;
applying the received updates the replicated portion of the data set stored at the first node;
subsequent to applying the received updates to the replicated portion of the data set stored at the first node, in response to determining that the replicated portion at the first node is consistent with the data set, performing, by the first node, the query with respect to the replicated portion of the data set; and
returning, by the first node, a result for the query performed by the first node.

6. The method of claim 5, wherein evaluating the respective global time values identified for the plurality of updates to the replicated portion performed at the plurality of other nodes that perform updates to the data set to determine that the replicated portion at the first node is consistent with the data set according to the global time value for the query comprises:
determining that each of the plurality of other nodes sent at least one of the respective global time values; and
determining that the respective global time values for the received updates are later than the global time value identified for the query.

7. The method of claim 5, wherein the evaluation of the global time value identified for the query with regard to the respective global time values identified for the plurality of updates to the replicated portion performed at plurality of other nodes that perform updates to the data set to determine that the replicated portion at the first node is consistent with the data set according to the global time value for the query further comprises evaluation of the global time value identified for the query with regard to other respective global time values identified according to the global clock for one or more indications that no update was performed at one or more of the plurality of other nodes as part of the determination that the replicated portion of the data set is consistent with the data set.

8. The method of claim 5, wherein:
the evaluation of the global time value identified for the query with regard to the respective global time values identified for the plurality of updates to the replicated portion performed at the plurality of other nodes that perform updates to the data set further comprises prior to determining that the replicated portion at the first node is consistent with the data set:
evaluating the global time value identified for the query with regard to other respective global time values identified according to the global clock for one or more other received updates performed by at least one of the plurality of other nodes to determine that the replicated portion at the first node is not consistent with the data set according to the global time value for the query; and delaying performance of the evaluation of the global time value identified for the query with regard to the respective global time values identified for the plurality of received updates to the replicated portion until receiving the plurality of received updates.

9. The method of claim 8, further comprising:
in response to determining that the replicated portion at the first node is not consistent with the data set, sending, by the first node, a request for updates to the replicated portion of the data set.

10. The method of claim 5, further comprising:
for a given update to the data set performed at one of the plurality of other nodes:
  determining a local time for the given update at the one node;
  mapping, by the one node, the local time for the given update to a global time value according to the global clock; and
  sending, from the one node, the given update and the global time value to be replicated at the replicated portion of the data set.

11. The method of claim 10,
wherein the method further comprises obtaining, by the one node, global time value mappings from a global clock node that maps different ranges of local time for the one node to respective global time values of the global clock;
wherein mapping the local time for the given update to the global time value comprises identifying one of the different ranges that includes the local time for the given update that maps the identified range to the global time value.

12. The method of claim 5, wherein the query indicates a consistency requirement for performing the query.

13. The method of claim 5, wherein the data set is a database table partitioned across the plurality of other nodes and wherein the replicated portion is at least a portion of a secondary index for the database table.

14. A non-transitory, computer-readable storage medium, storing program instructions that when executed by one or more computing devices cause the one or more computing devices to implement:
receiving at a first node, a query directed to a replicated portion of a data set, the replicated portion stored at the first node;
identifying, by the first node, a global time value for the query according to a global clock, wherein the global time value for the query is determined based on a local time when the query is received at the first node;
receiving, at the first node from different ones of the plurality of other nodes, respective global time values identified for respective ones of a plurality of updates to the replicated portion, the updates received at the first node after being:
  received at respective ones of the plurality of other nodes that store respective subsets of the data set;
  identified with different respective local times at which the respective update is received at the respective node of the plurality of other nodes;
  performed independently at the respective ones of the plurality of other nodes that store respective subsets of the data set; and
  mapped to respective ones of the global time values according to the global clock based on the determined different respective local times;
wherein at least two of the respective local times of respective ones of at least two different updates received at the first node differ from one another and map to a same global time value of the respective global time values;
delaying, by the first node, performance of the query at the first node until a determination that the replicated portion at the first node is consistent with the data set at the global time value identified for the query, wherein the determination comprises:
  comparing respective global time values of a plurality of updates of the data set that have been performed independently at respective ones of the plurality of other nodes and received at the first node, to the global time value identified for the query; and
  based on the comparison, determining that performances of the plurality of updates applied to the replicated portion of the data set makes the replicated portion of the data set consistent with the data set at the global time value identified for the query;
applying the received updates to the replicated portion of the data set stored at the first node;
subsequent to applying the received updates to the replicated portion of the data set stored at the first node, in response to determining that the replicated portion at the first node is consistent with the data set, performing, by the first node, the query with respect to the replicated portion of the data set; and
returning, by the first node, a result for the query performed by the first node.

15. The non-transitory, computer-readable storage medium of claim 14, wherein, to perform the evaluation of the global time value identified for the query with regard to the respective global time values identified for the plurality of updates to the replicated portion performed at the plurality of other nodes that perform updates to the data set to determine that the replicated portion at the first node is consistent with the data set according to the global time value for the query, the program instructions cause the one or more computing devices to implement:
  determining that each of the plurality of nodes sent at least one of the respective global time values; and
  determining that the respective global time values for the received updates are later than the global time value identified for the query.

16. The non-transitory, computer-readable storage medium of claim 14, wherein, in implementing the evaluation of the global time value identified for the query with regard to the respective global time values identified for the plurality of updates to the replicated portion performed at the plurality of other nodes that perform updates to the data set to determine that the replicated portion at the first node is consistent with the data set according to the global time value for the query, the program instructions cause the one or more computing devices to implement evaluation of the global time value identified for the query with regard to other respective global time values identified according to the global clock for one or more indications that no update was performed at one or more of the plurality of nodes as part of the determination that the replicated portion of the data set is consistent with the data set.

17. The non-transitory, computer-readable storage medium of claim 14, wherein the program instructions cause the one or more computing devices to further implement:

prior to determining that the replicated portion at the first node is consistent with the data set:
  evaluating the global time value identified for the query with regard to other respective global time values identified according to the global clock for one or more other received updates performed by at least one of the plurality of other nodes to determine that the replicated portion at the first node is not consistent with the data set according to the global time value for the query; and
  delaying performance of the evaluation of the global time value identified for the query with regard to the respective global time values identified for the plurality of received updates to the replicated portion until receiving the plurality of received updates.

18. The non-transitory, computer-readable storage medium of claim 14, wherein the program instructions cause the one or more computing devices to further implement receiving the plurality of received updates from one or more propagation nodes.

19. The non-transitory, computer-readable storage medium of claim 14, wherein the program instructions cause the one or more computing devices to further implement:
  for a given update to the data set performed at one of the plurality of other nodes:
    determining a local time for the given update at the one node;
    mapping, by the one node, the local time for the given update to a global time value according to the global clock; and
    sending, from the one node, the given update and the global time value to be replicated at the replicated portion of the data set.

20. The non-transitory, computer-readable storage medium of claim 14, wherein the first node and the plurality of other nodes are implemented as part of network-based, non-relational database service, wherein the data set is a database table partitioned across the plurality of other nodes, wherein the updates are performed at the plurality of other nodes in response to requests from one or more clients of the non-relational database service, and wherein the replicated portion of the data set is a partition of a secondary index for the database table.

\* \* \* \* \*